United States Patent
Vajravel et al.

(10) Patent No.: US 10,097,534 B2
(45) Date of Patent: Oct. 9, 2018

(54) SYSTEM AND METHOD TO REDIRECT HARDWARE SECURE USB STORAGE DEVICES IN HIGH LATENCY VDI ENVIRONMENTS

(71) Applicant: Dell Products L.P., Round Rock, TX (US)

(72) Inventors: Gokul T. Vajravel, Bangalore (IN); Ramanujam Kaniyar Venkatesh, Bangalore (IN)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 14/839,465

(22) Filed: Aug. 28, 2015

(65) Prior Publication Data
US 2017/0063832 A1    Mar. 2, 2017

(51) Int. Cl.
*H04L 29/06*    (2006.01)

(52) U.S. Cl.
CPC ............ *H04L 63/083* (2013.01); *H04L 63/10* (2013.01)

(58) Field of Classification Search
CPC ...... H04L 63/083; H04L 63/123; H04L 63/10
See application file for complete search history.

(56) References Cited

U.S. PATENT DOCUMENTS

| | | | | |
|---|---|---|---|---|
| 5,598,563 A * | 1/1997 | Spies | ............... | G06F 9/4411 713/2 |
| 6,298,401 B1 * | 10/2001 | Anderson | ............ | G06F 3/0607 707/999.103 |
| 6,321,358 B1 * | 11/2001 | Anderson | ............... | G11B 5/64 714/763 |
| 6,529,949 B1 * | 3/2003 | Getsin | ................. | G06F 21/10 380/202 |
| 6,763,399 B2 * | 7/2004 | Margalit | ............... | G06F 21/34 710/13 |
| 6,895,588 B1 * | 5/2005 | Ruberg | ................ | H04L 29/06 709/223 |
| 7,017,162 B2 * | 3/2006 | Smith | ................. | G06F 9/465 719/315 |
| 7,111,106 B2 * | 9/2006 | Ohnishi | ............... | G06F 13/385 370/421 |
| 7,320,071 B1 * | 1/2008 | Friedman | ............... | G06F 21/85 713/165 |

(Continued)

OTHER PUBLICATIONS

Universal Serial Bus Mass storage, Bulk Only Transport specification—Revision 1.0, Sep. 31, 1999, USB.org, www.usb.org/developers/docs/devclass_docs/usbmassbulk_10.pdf, 22 pages.

(Continued)

*Primary Examiner* — David Garcia Cervetti
(74) *Attorney, Agent, or Firm* — Baker Botts L.L.P.

(57) ABSTRACT

In certain information handling system environments, physical devices connected to a client are redirected to a server or other information handling system. Requests to a virtualized hardware secure device may not be accessible due to the latency of the network. A server may request that a locking application of a CDROM driver (or interface) unlock a secured disk interface/logical unit of a redirected hardware secure device. The locking application validates a user entered password. Once unlocked the secured disk interface/logical unit is accessible via an associated file system stack at the server.

20 Claims, 8 Drawing Sheets

(56) References Cited

U.S. PATENT DOCUMENTS

| | | | | |
|---|---|---|---|---|
| 7,349,391 B2* | 3/2008 | Ben-Dor | H04L 12/40123 | 370/230 |
| 7,549,161 B2* | 6/2009 | Poo | G06F 21/32 | 713/172 |
| 7,712,131 B1* | 5/2010 | Lethe | G06F 21/57 | 701/29.1 |
| 8,010,630 B2* | 8/2011 | Barreto | H04L 29/08846 | 709/219 |
| 8,249,655 B2* | 8/2012 | Kim | G06K 7/0021 | 235/375 |
| 8,266,378 B1* | 9/2012 | Jevans | G06F 12/1466 | 711/115 |
| 8,321,686 B2* | 11/2012 | Holtzman | G06F 21/72 | 380/277 |
| 8,341,306 B1* | 12/2012 | Luttman | G06F 9/4411 | 710/13 |
| 8,738,711 B2* | 5/2014 | Walsh | H04L 67/02 | 709/203 |
| 8,789,146 B2* | 7/2014 | Ehrensvard | G06F 21/35 | 380/227 |
| 8,924,700 B1* | 12/2014 | Karmarkar | G06F 9/00 | 713/2 |
| 9,021,200 B1* | 4/2015 | Kushmerick | G06F 12/02 | 711/114 |
| 9,081,946 B2* | 7/2015 | Fruhauf | G06F 21/80 | |
| 9,319,452 B2* | 4/2016 | Kaushik | H04L 67/02 | |
| 9,374,351 B1* | 6/2016 | Basha P. R. | H04L 63/0807 | |
| 9,385,772 B1* | 7/2016 | Sekuru | H04W 4/80 | |
| 9,485,233 B1* | 11/2016 | Basha P. R. | H04L 63/08 | |
| 9,529,754 B1* | 12/2016 | Vajravel | G06F 13/385 | |
| 9,594,770 B1* | 3/2017 | Kushmerick | G06F 17/30233 | |
| 9,875,076 B1* | 1/2018 | Fausak | G06F 3/1454 | |
| 9,936,047 B2* | 4/2018 | Adolph | H04L 67/34 | |
| 2002/0059539 A1* | 5/2002 | Anderson | G06F 11/1096 | 714/6.22 |
| 2002/0087653 A1* | 7/2002 | Duroj | G06F 21/80 | 709/213 |
| 2003/0126132 A1* | 7/2003 | Kavuri | G06F 3/0601 | |
| 2004/0019681 A1* | 1/2004 | Nakamura | H04L 29/06 | 709/226 |
| 2004/0028043 A1* | 2/2004 | Maveli | H04L 29/06 | 370/392 |
| 2004/0028063 A1* | 2/2004 | Roy | H04L 29/06 | 370/402 |
| 2005/0066129 A1* | 3/2005 | Chang | G06F 9/4411 | 711/115 |
| 2005/0273312 A1* | 12/2005 | Sandulescu | G06F 3/023 | 703/25 |
| 2006/0003638 A1* | 1/2006 | Huang | H01R 13/642 | 439/660 |
| 2006/0031547 A1* | 2/2006 | Tsui | G06F 9/4416 | 709/231 |
| 2006/0161725 A1* | 7/2006 | Lee | G06F 3/0607 | 711/103 |
| 2006/0173805 A1* | 8/2006 | Clifford | G06F 17/30067 | |
| 2006/0184806 A1* | 8/2006 | Luttmann | G06F 12/1466 | 713/193 |
| 2006/0242066 A1* | 10/2006 | Jogand-Coulomb | G06F 21/10 | 705/50 |
| 2006/0259785 A1* | 11/2006 | Thibadeau | G06F 21/80 | 713/193 |
| 2007/0011446 A1* | 1/2007 | Kato | G06F 21/305 | 713/150 |
| 2007/0016721 A1* | 1/2007 | Gay | G06F 12/0246 | 711/103 |
| 2007/0038768 A1* | 2/2007 | Fausak | H04L 67/2823 | 709/230 |
| 2007/0043667 A1* | 2/2007 | Qawami | G06F 21/10 | 705/50 |
| 2007/0050538 A1* | 3/2007 | Northcutt | G06F 3/0605 | 711/112 |
| 2007/0061477 A1* | 3/2007 | Stoyanov | G06F 9/4411 | 709/230 |
| 2007/0110245 A1* | 5/2007 | Sood | H04L 9/0844 | 380/270 |
| 2007/0153580 A1* | 7/2007 | Luft | G06F 21/606 | 365/185.19 |
| 2007/0168292 A1* | 7/2007 | Jogand-Coulomb | G06F 21/6218 | 705/52 |
| 2007/0168481 A1* | 7/2007 | Lambert | G06F 13/128 | 709/223 |
| 2007/0288623 A1* | 12/2007 | Kato | G06F 21/33 | 709/223 |
| 2008/0005409 A1* | 1/2008 | Kolokowsky | G06F 13/385 | 710/62 |
| 2008/0005414 A1* | 1/2008 | Liu | G06F 3/023 | 710/62 |
| 2008/0046751 A1* | 2/2008 | Choi | G06F 21/34 | 713/185 |
| 2008/0104399 A1* | 5/2008 | Fascenda | H04L 9/3271 | 713/168 |
| 2008/0107262 A1* | 5/2008 | Helfman | G06F 21/62 | 380/44 |
| 2008/0140811 A1* | 6/2008 | Welch | H04L 12/4625 | 709/219 |
| 2008/0168118 A1* | 7/2008 | Hickey | G06F 13/385 | 709/201 |
| 2008/0263349 A1* | 10/2008 | Ota | G06F 9/4416 | 713/2 |
| 2008/0288782 A1* | 11/2008 | Iyer | G06F 21/80 | 713/186 |
| 2009/0049307 A1* | 2/2009 | Lin | G06F 21/72 | 713/185 |
| 2009/0150550 A1* | 6/2009 | Barreto | H04L 29/08846 | 709/228 |
| 2009/0150909 A1* | 6/2009 | Barreto | G06F 9/4411 | 719/324 |
| 2009/0204964 A1* | 8/2009 | Foley | G06F 21/53 | 718/1 |
| 2009/0204965 A1* | 8/2009 | Tanaka | G06F 9/5077 | 718/1 |
| 2009/0206988 A1* | 8/2009 | Chochois | G06F 21/6272 | 340/5.52 |
| 2009/0217375 A1* | 8/2009 | Joosten | G06F 21/575 | 726/19 |
| 2009/0282212 A1* | 11/2009 | Peterson | G06F 12/1433 | 711/173 |
| 2009/0319789 A1* | 12/2009 | Wilson | H04L 9/12 | 713/168 |
| 2010/0031255 A1* | 2/2010 | Huber | G06F 8/61 | 718/1 |
| 2010/0049750 A1* | 2/2010 | Srivastava | G06F 11/1435 | 707/E17.005 |
| 2010/0083384 A1* | 4/2010 | Borchert | G06F 21/572 | 726/27 |
| 2010/0138652 A1* | 6/2010 | Sela | G06F 21/445 | 713/158 |
| 2010/0161928 A1* | 6/2010 | Sela | G06F 12/1441 | 711/163 |
| 2010/0306424 A1* | 12/2010 | Akester | G06F 3/023 | 710/36 |
| 2011/0131421 A1* | 6/2011 | Jogand-Coulomb | G06F 8/61 | 713/189 |
| 2011/0141124 A1* | 6/2011 | Halls | G06F 21/83 | 345/522 |
| 2011/0150436 A1* | 6/2011 | Hesselink | H04N 5/765 | 386/343 |
| 2011/0154023 A1* | 6/2011 | Smith | G06F 21/78 | 713/155 |
| 2011/0173353 A1* | 7/2011 | Bauman | G06F 9/45558 | 710/28 |
| 2011/0202765 A1* | 8/2011 | McGrane | G06F 21/53 | 713/168 |
| 2011/0202916 A1* | 8/2011 | VoBa | G06F 21/62 | 718/1 |

(56) References Cited

U.S. PATENT DOCUMENTS

| | | | | |
|---|---|---|---|---|
| 2011/0304443 | A1* | 12/2011 | Sheridan | H04N 7/163 340/12.5 |
| 2011/0320799 | A1* | 12/2011 | Lam | G06F 8/63 713/2 |
| 2012/0072659 | A1* | 3/2012 | Wade | G06F 11/1453 711/112 |
| 2012/0084552 | A1* | 4/2012 | Sakthikumar | G06F 21/572 713/100 |
| 2012/0090022 | A1* | 4/2012 | Walkes | G06F 21/85 726/19 |
| 2012/0102305 | A1* | 4/2012 | Liang | G06F 9/4406 713/2 |
| 2012/0131336 | A1* | 5/2012 | Price | G06F 21/78 713/165 |
| 2012/0148051 | A1* | 6/2012 | Schwarz | G06F 21/31 380/278 |
| 2012/0159137 | A1* | 6/2012 | Khosravi | G06F 21/572 713/2 |
| 2012/0185636 | A1* | 7/2012 | Leon | H01L 23/576 711/102 |
| 2012/0221611 | A1* | 8/2012 | Watanabe | G06F 3/0608 707/827 |
| 2012/0221622 | A1* | 8/2012 | Raju | H04L 67/08 709/202 |
| 2012/0222124 | A1* | 8/2012 | Raju | G06F 21/575 726/26 |
| 2012/0266212 | A1* | 10/2012 | Jiang | H04L 63/0853 726/3 |
| 2012/0311237 | A1* | 12/2012 | Park | G06F 12/0246 711/103 |
| 2013/0007224 | A1* | 1/2013 | Yang | H04L 67/08 709/219 |
| 2013/0034230 | A1* | 2/2013 | Takahashi | H04W 12/02 380/270 |
| 2013/0111561 | A1* | 5/2013 | Kaushik | H04L 63/105 726/4 |
| 2013/0132618 | A1* | 5/2013 | de Goede | G06F 13/105 710/48 |
| 2013/0132620 | A1* | 5/2013 | de Goede | G06F 13/105 710/53 |
| 2013/0132942 | A1* | 5/2013 | Wang | G06F 8/61 717/176 |
| 2013/0132960 | A1* | 5/2013 | de Goede | G06F 9/46 718/101 |
| 2013/0297813 | A1* | 11/2013 | Kaushik | H04L 63/10 709/229 |
| 2013/0346532 | A1* | 12/2013 | D'Amato | G06F 3/0617 709/213 |
| 2014/0108795 | A1* | 4/2014 | Bi | G06F 21/6218 713/165 |
| 2014/0195217 | A1* | 7/2014 | Myrick | G06F 17/5009 703/21 |
| 2014/0337558 | A1* | 11/2014 | Powers | G06F 13/4072 710/313 |
| 2015/0019875 | A1* | 1/2015 | Barbiero | G06F 21/602 713/189 |
| 2015/0052353 | A1* | 2/2015 | Kang | G06F 21/6218 713/165 |
| 2015/0220381 | A1* | 8/2015 | Horgan | G06F 11/0748 714/27 |
| 2015/0289134 | A1* | 10/2015 | Johnston | H04M 1/673 380/270 |
| 2015/0358161 | A1* | 12/2015 | Kancharla | H04L 63/0485 713/164 |
| 2015/0358294 | A1* | 12/2015 | Kancharla | G06F 21/335 713/164 |
| 2016/0065371 | A1* | 3/2016 | Vecera | G06F 12/1408 713/193 |
| 2016/0330492 | A1* | 11/2016 | Eguchi | H04N 19/426 |
| 2017/0063988 | A1* | 3/2017 | Vajravel | H04L 67/1097 |
| 2017/0111455 | A1* | 4/2017 | Raju | H04L 67/141 |
| 2017/0143206 | A1* | 5/2017 | Kotz | A61B 5/0028 |
| 2017/0186140 | A1* | 6/2017 | Eguchi | G06T 5/003 |

OTHER PUBLICATIONS

FSCTL_LOCK_VOLUME control code by Microsoft at <<https://msdn.microsoft.com/en-us/library/windows/desktop/aa364575(v=vs.85).aspx>>, 3 pages, 2015.

FSCTL_DISMOUNT_VOLUME control code by Microsoft at <<https://msdn.microsoft.com/en-us/library/windows/desktop/aa364562(v=vs.85).aspx>>, 3 pages, 2015.

* cited by examiner

SYSTEM AND METHOD TO REDIRECT HARDWARE SECURE USB STORAGE DEVICES IN HIGH LATENCY VDI ENVIRONMENTS

TECHNICAL FIELD

This disclosure generally relates to redirection of a hardware secure universal serial bus (USB) storage device, for example, a hardware secure flash drive, in a high latency environment where responses to requests are handled by the client.

BACKGROUND

As the value and use of information continues to increase, individuals and businesses seek additional ways to process and store information. One option available to these users is an information handling system or computing system. An information handling system generally processes, compiles, stores, and/or communicates information or data for business, personal, or other purposes thereby allowing users to take advantage of the value of the information. Because technology and information handling needs and requirements vary between different users or applications, information handling systems may vary with respect to the type of information handled; the methods for handling the information; the methods for processing, storing or communicating the information; the amount of information processed, stored, or communicated; and the speed and efficiency with which the information is processed, stored, or communicated. The variations in information handling systems allow for information handling systems to be general or configured for a specific user or specific use such as financial transaction processing, airline reservations, enterprise data storage, or global communications. In addition, information handling systems may include or comprise a variety of hardware and software components that may be configured to process, store, and communicate information and may include one or more computer systems, data storage systems, and networking systems. The software components may comprise one or more modules that contain instructions that when executed perform one or more functions.

The information handling system may include one or more operating systems. An operating system serves many functions, such as controlling access to hardware resources and controlling the execution of application software. Operating systems also provide resources and services to support application software. These resources and services may include a file system, a centralized configuration database (such as the registry found in Microsoft Windows operating systems), a directory service, a graphical user interface, a networking stack, device drivers, and device management software. In some instances, services may be provided by other application software running on the information handling system, such as a database server.

Some information handling systems are designed to interact with other information handling systems over a network connection. In some instances, the information handling systems may share resources over the network. Certain of the networked information handling systems may act as servers, while others act as clients. In such systems, client applications and client devices may be designed so that the majority of the heavily used resources are at a shared information handling system, such as a centralized server. The client devices may have minimal memory, disk storage, and processor power. Use of such client devices may reduce the total cost of ownership because of the reduced use of resources at the client devices and because the clients can be centrally administered and updated from the server. Such client devices may be particularly well-suited for a network which can handle a significant number of devices.

Virtual desktop infrastructure (VDI) environments may include any one or more information handling systems. A virtual environment, such as a VDI, separates a desktop environment and its associated software in a data center or server, from the information handling system that is used to access the desktop environment. A "virtual desktop" may refer to any number of methodologies including server-based computing (SBC) where a number of users share the desktop of a server-based operating system, VDI where each user gets their own virtual machine which typically runs a client operating system, and application virtualization technologies that concentrate more closely on making specific applications available to users with these applications, for example, being hosted on a remote system or streamed to the user's local system. With respect to the virtual desktop technologies described, SBC is often regarded as being appropriate for task/call-center type environments, while VDI is more commonly deployed for knowledge workers who require a higher level of user personalization, and application virtualization technologies may be commonly deployed across SBC, VDI and physical desktop environments to solve business challenges such as legacy application OS compatibility.

In universal serial bus (USB) virtualization solutions, a USB storage devices, such as a hardware secure USB storage device, are virtualized in the server. Read and write transactions are transferred to the USB storage device connected to the client over a network. In some instances, hardware secured or encrypted USB storage devices come with a chip for handling encryption of data. A hardware secure USB storage device typically includes two storage interfaces. One interface is the compact disk read-only memory (CDROM) interface and the other interface is the disk interface. The CDROM interface is generally small in size and is read-only. The disk interface, used for data, is generally larger in size. The CDROM interface will contain software or application(s) to interact with the hardware security controller. The hardware security controller controls the hidden disk interface by encrypting the data and hiding/exposing the disk interface based on received requests. Hardware secure USB storage devices with the help of an application of the CDROM interface will prompt for a password upon being coupled to an information handling system. The data partition is encrypted and going forward the password will be required each time the hardware secure USB storage device is plugged into an information handling system. After the password is entered, the application of the CDROM interface communicates to the hardware security controller and it exposes the hidden or secured disk interface. Thereafter the disk interface behaves in the same manner as any other flash drive.

However, in high latency networks, such as a wide area network (WAN), the redirected hardware secure USB storage device may suffer from a performance loss due to the number of USB redirection transactions. These USB virtualization solutions are a request and response architecture. Data is read from the virtualized hardware secure USB storage device (a virtual disk) by making multiple read requests (including device probe requests) in that a single read request cannot read the complete data. This causes delay while the data is being accessed. Some of the requests are device status requests and the operating system does the probing of the hardware secure USB storage devices very frequently. In a high latency network, the delay may be increased and packet loss may occur making the virtualized hardware secure USB storage device unusable, costly, or ineffective. For example, in a high latency network each transaction takes longer to complete or a packet is lost and needs to be retransmitted. Thus, the hardware secure USB storage device may be unusable as the secured disk interface/logical unit cannot be unlocked within the predetermined time period. Also, classic network drive mapping cannot unlock these hardware secure USB storage devices over a network because the raw reads and writes are not allowed. Further, the CDROM interface is mapped as a different device. That is, it is redirected as having a different interface/logical unit number (LUN). The security application associated with unlocking the hardware secure USB storage device will not function properly as the CDROM interface has been mapped as a different device. The present disclosure provides systems and methods to address this problem.

BRIEF DESCRIPTION OF THE DRAWINGS

A more complete understanding of the present embodiments and advantages thereof may be acquired by referring to the following description taken in conjunction with the accompanying drawings, in which like reference numbers indicate like features, and wherein.

DESCRIPTION

Figure 1:
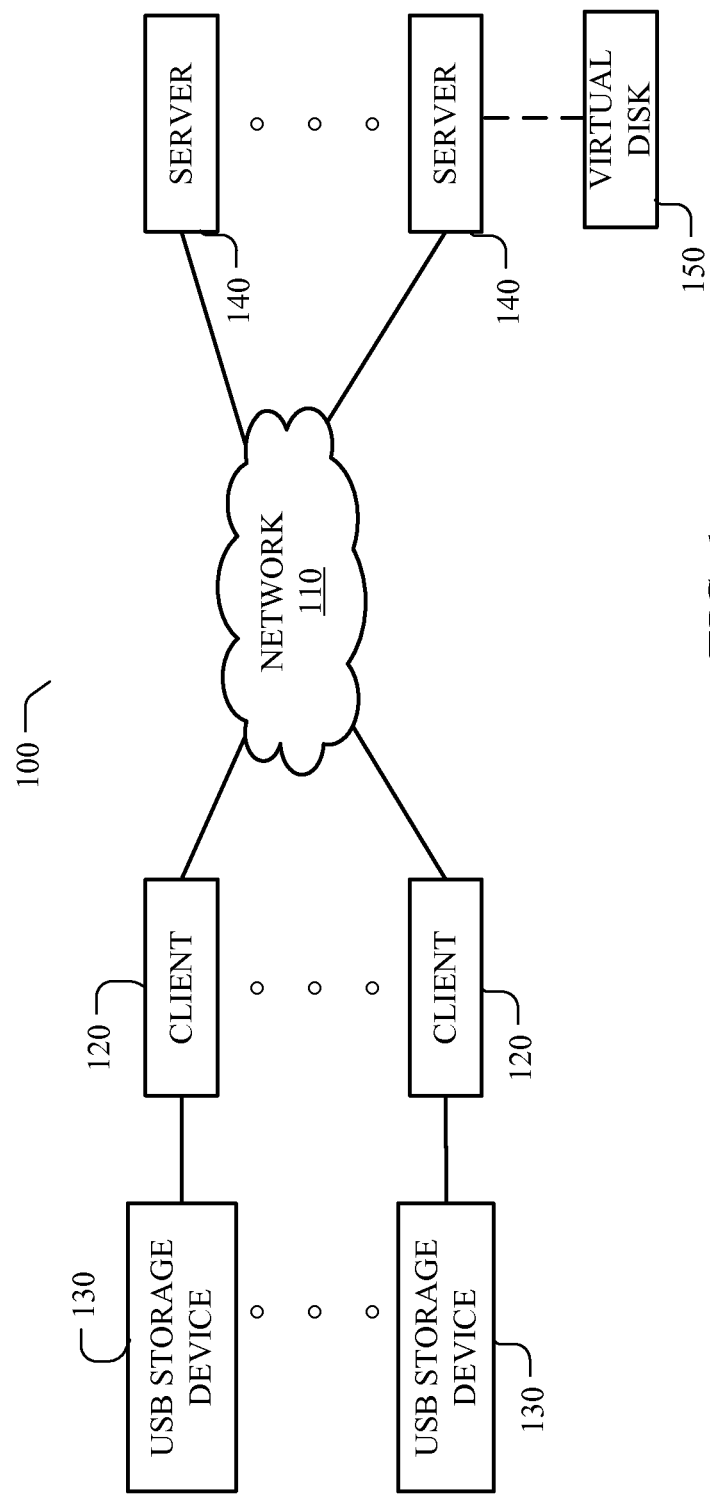
FIG. 1 illustrates an example configuration of networked information handling systems according to one embodiment of the present disclosure.

This disclosure generally relates to remote computing and, in particular, relates to virtualizing a hardware secure universal serial bus (USB) storage device as a 'generic storage device' with CDROM and disk as their logical units or interfaces at the server with the file system for the virtualized disk created at the server side. The proxy server via a USB virtual disk enumerator prepares requests (read and write requests) that are sent to the virtual disk (the redirected hardware secure USB storage device) for processing by the disk stack at the client. Such is especially beneficial in a high latency network where the burden of transmitting at a minimum five transaction requests per read/write command may result in the loss of data or such delays that the virtual disk is not usable as the password to unlock the hardware secure USB storage device cannot be input to unencrypt the secured disk interface/logical unit. A file system is created at the server associated with the CDROM driver at the server. A locking application resides in the CDROM driver. Once the correct password is entered via the locking application, the hardware security controller unlocks the disk interface. Once the disk interface is unlocked, the file-system will be loaded by the operating system (OS), such as the Windows OS. Thereafter the disk interface acts as a normal disk accepting the read and writes requests from any application.

The present disclosure is advantageous as the CDROM interface is exposed as part of the same hardware secure USB storage device as opposed to a different device, it supports all types of hardware secure USB storage devices, supports raw read and write transaction, is oblivious to the USB hub/controller type and the bus speed as the USB hub driver is present only at the client side where the USB hub driver hides and abstracts this information; supports large data transfer as USB data transfer size is dictated by the maximum transfer length of the USB endpoint or pipe which is advertised by the USB hub driver at the client side for every USB device connected to the client; provides a data transfer speed on par with network drive mapping by reducing the volume of transaction requests; requires less bandwidth compared to traditional USB storage device redirection because there is no USB packet overhead (for example, USB request block (URB)), the number of requests per transaction is reduced to two, and the architecture supports large data transfers; and supports disk management functions like partitioning, formatting and changing the file size which may not be available on a thin client that does not have a complete file system stack but are available at the server for the virtual disk.

For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU) or hardware or software control logic, read-only memory (ROM), and/or other types of nonvolatile memory. Additional components of the information handling system may include one or more disk drives, one or more network ports for communication with external devices as well as various input and output (I/O) devices, such as a keyboard, a mouse, and a video display. The information handling system may also include one or more buses operable to transmit communications between the various hardware components.

For the purposes of this disclosure, computer-readable storage media may include any instrumentality or aggregation of instrumentalities that may retain data and/or instructions for a period of time. Computer-readable storage media may include, for example without limitation, storage media such as a direct access storage device (for example, a hard disk drive or floppy disk), a sequential access storage device (for example, a tape disk drive), compact disk, compact disk read-only memory (CD-ROM), digital video disc (DVD), random access memory (RAM), ROM, electrically erasable programmable read-only memory (EEPROM), and/or flash memory.

As used herein, a "local" device of a system, or a device "locally" connected to a system, may be a device directly connected to the system using one or more wires or connectors (for example, physically connected to the system), a device indirectly connected to the system using one or more hubs, or a device directly connected to the system using a wireless link. Furthermore, in one aspect of the present disclosure, a local device of a system or a device locally connected to a system may include a device within the system (for example, an internal device).

The present disclosure is now described in detail with reference to a few embodiments thereof as illustrated in the accompanying drawings. In the following description, numerous specific details are set forth in order to provide a thorough understanding of the present disclosure. However, the present disclosure may be practiced without some or all of these specific details. In other instances, well known process steps and/or structures have not been described in detail in order not to unnecessarily obscure the present disclosure. In addition, while the disclosure is described in conjunction with the particular embodiments, it should be understood that this description is not intended to limit the disclosure to the described embodiments. To the contrary, the description is intended to cover alternatives, modifications, and equivalents as may be included within the spirit and scope of the disclosure as defined by the appended claims.

In systems based on the server/client model, certain resources may be shared amongst clients or between clients and servers via a network. For example, in one embodiment the network is a wide area network (WAN) or a local area network (LAN). In some circumstances, it may be advantageous to make peripheral devices connected locally at one client device available to one or more other information handling systems on the network.

One type of client information handling system may be a thin client, also known as a lean or slim client. A thin client is a computer or computer program which depends on some other computer, for example, a server, to fulfill at least some of the computational roles required of the thin client. In certain configurations of one or more information handling systems, multiple users may login to the same server. The users may be permitted to work simultaneously even though they may be physically located at separate locations. According to the present disclosure, the users may be permitted to simultaneously access data, applications, and/or hardware associated with the server (or other information handling system). The server itself may be a physical machine or a virtual machine (VM).

A user may access devices redirected to the server as if those devices are available locally to the user by connecting all the necessary peripherals. For example, the user may connect to universal serial bus (USB) printers, scanners, USB storage devices such as a USB flash drive, and any other device known to one of ordinary skill in the art.

As an example, if a hardware secure USB storage device is connected to a given client via a standard USB connection, the locally connected hardware secure USB storage device may be redirected to the server. The redirected hardware secure USB storage device may then be installed locally at the server for use by any number of clients. The server treats the hardware secure USB storage device as a virtual disk attached to the server.

FIG. 1 at 100 illustrates an example configuration of a networked information handling system. In particular embodiments, one or more client devices 120 and one or more servers 140 are connected via network 110. Many types of peripheral devices may be connected locally to the client devices 120. As shown in FIG. 1, in some embodiments, one or more USB storage devices 130, for example, one or more hardware secure USB storage devices, connect to the client devices 120. According to the present disclosure, in one embodiment one or more hardware secure USB storage devices 130 may appear to one or more of servers 140 as if they are locally installed on and connected to those servers 140. In certain embodiments, these hardware secure USB storage devices 130 may be redirected such that they appear to be locally installed or locally shared with another client device 120. In one embodiment, the Dell Wyse TCX USB Virtualization is used to virtualize the hardware secure USB storage device 130. In one or more embodiments, one or more hardware secure USB storage devices 130 may be virtualized as a 'generic disk' device (a virtual disk (or virtual hardware secure disk) 150) at a server 140. In one or more embodiments, the hardware secure USB storage device 130 may be a hardware secure USB storage device that includes a secured disk interface/logical unit.

Figure 2:
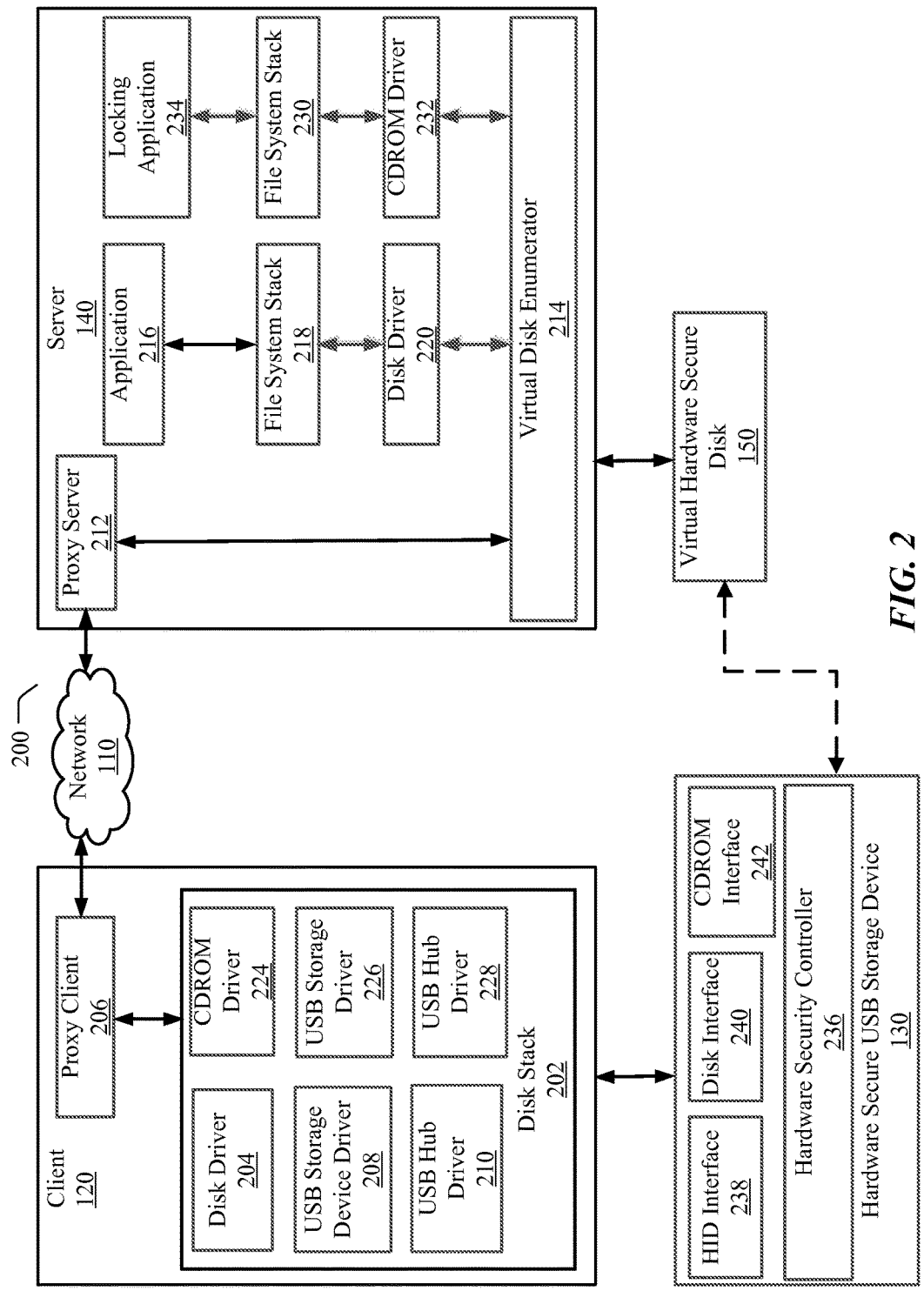
FIG. 2 illustrates an example system of a networked client and server according to one embodiment of the present disclosure.

FIG. 2 at 200 illustrates an example embodiment of a system configured to redirect a hardware secure USB storage device 130, for example, a hardware secure USB flash drive or hard disk drive. In a particular embodiment, the configuration shown in FIG. 2 illustrates a virtual environment that may include one or more of Virtual Desktop Infrastructure (VDI) environment, Server-Based Computing (SBC) environment, and application virtualization technologies. This disclosure contemplates any number of virtual environments as known to one of ordinary skill in the art. As a result of the suitability of these technologies for different user types, many organizations are choosing to implement a hybrid approach that uses each of the technologies including using multiple vendors within each technology. The decision as to which users to allocate to which technology type may be difficult in advance of any actual implementation of a particular technology for a particular user.

The hardware secure USB storage device includes a CDROM interface 242, a disk interface 240 that is secured, and an optional USB human interface device (USB HID) interface 238. The optional USB HID interface permits a user to interact with the hardware secure USB storage device 130. For example, the USB HID interface may include keys or buttons where a user may enter a password or other information. The CDROM interface 242 stores one or more secure login applications. The disk interface 240, unlike the CDROM interface 242, is both a read and a write media used to access the virtual hardware secure disk 150 after successful execution of an applicable locking application 234.

Client 120 includes a disk stack 202. Disk stack 202 includes a disk driver 204, a USB storage device driver 208, and a USB hub driver 210. Disk stack 202 also includes with respect to a compact disk read only memory (CDROM) interface, a CDROM driver 224, a USB storage driver 226 for the CDROM interface 242, and a USB hub driver 228 for the CDROM interface 242. The disk driver 204 manages disks, including hardware secure USB storage device 130, and converts any generic read and write requests to the appropriate storage request. The disk driver 204 receives any data from one or more applications 216 directed to the virtual hardware secure disk 150. The data passes through the USB storage driver 208 and then to the USB hub driver 210 where the USB hub driver 210 breaks the data into multiple data transfers for transmission to the hardware secure USB storage device 130.

The CDROM driver 224 interacts with the CDROM interface 242 of the hardware secure USB storage device 130 to handle secure logins. By default, CDROMs are read-only devices; a feature that ensures the security application stored on the CDROM interface 242 cannot be altered or modified. USB hub driver 228 and USB storage driver 226 manage the appropriate device objects created for CDROM driver 224. Generally, USB hub driver 228 and USB storage driver 226 operate in a similar manner to USB hub driver 210 and USB storage device driver 208, respectively.

Client 120 recognizes hardware secure USB storage device 130, which is connected locally. The client 120 loads the USB storage driver 208 and CDROM driver 224. The USB storage driver 208 manages the hardware secure USB storage device 130 and converts any generic read and write requests to the appropriate URB or request. The USB storage driver 208 loads the disk driver 204. The USB hub driver 210 primarily manages the USB hubs and corresponding ports and enumerates any USB devices connected to these ports. Client 120 may be configured to automatically install all or only certain hardware secure USB storage devices 130 locally, may be configured to automatically redirect all or certain hardware secure USB storage devices 130 to server 140, or may be configured to request input from a user of client 120 or from another source to determine whether to install a particular hardware secure USB storage device 130 or interface locally or to redirect it.

If a hardware secure USB storage device 130 is configured to be redirected to server 140, the redirection may operate generally as described in U.S. Pat. No. 8,010,630 to Barreto, et al., which is incorporated herein by reference. In particular embodiments, client 120 connects to server 140 via network 110. Network 110 may be a high latency network. A proxy client 206 on client 120 may coordinate communications between hardware secure USB storage device 130 and the proxy server 212 of server 140. In particular, proxy client 206 may be configured to receive socket connection information from proxy server 212 of server 140 and initiate redirecting device transactions to and from the hardware secure USB storage device 130 to proxy server 212 on server 140.

USB storage devices, such as hardware secure USB storage device 130, adhere, in general, to the USB storage bulk only transport (BOT) specification/protocol. Per the BOT protocol, every read/write request must sequence through the following transactions: 1) Command Block Wrapper (CBW) transfer [command]; 2) CBW completion; 3) data transfer; 4) Command Status Wrapper (CSW) request [get status]; 5) CSW completion [data transfer status]. At a minimum, generally every hardware secure USB storage device 130 read/write requires executing five transactions. The data transfer size will be limited to the hardware secure USB storage device's 130 maximum transfer size.

Figure 7:
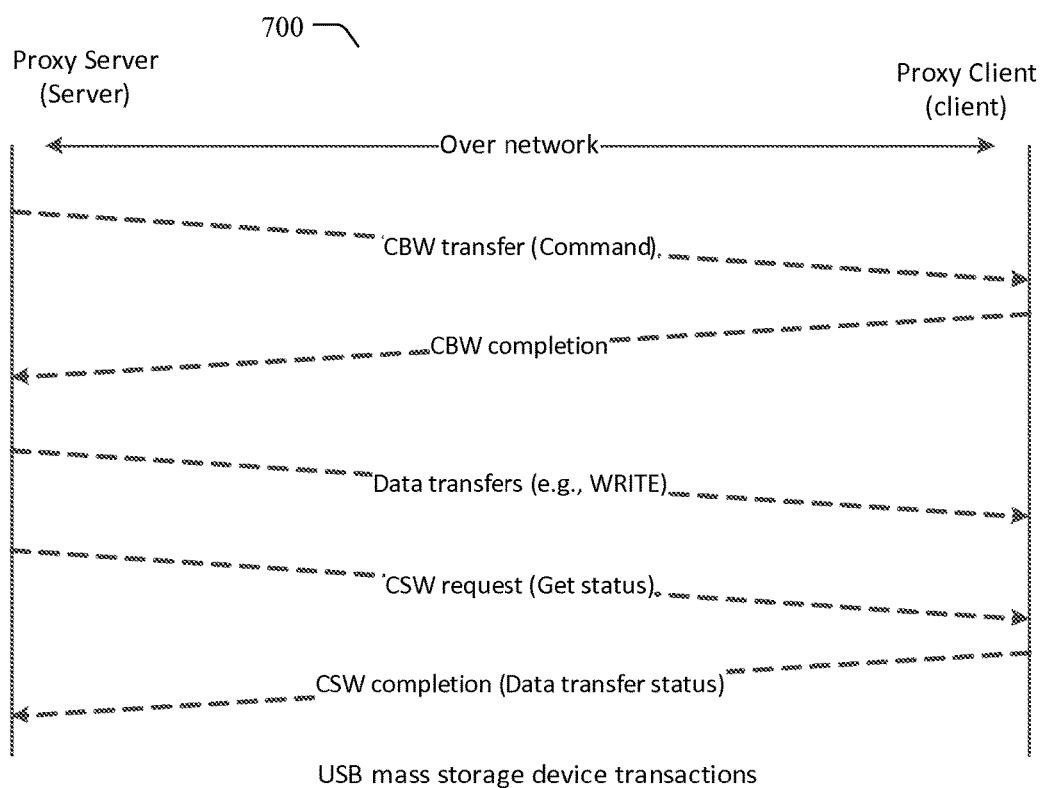
FIG. 7 illustrates transaction requests between a client and server for a typical virtualization environment.

These transactions to/from the client 120 to/from the server 140 are illustrated in FIG. 7. The five types of transaction are depicted. In general, for each read and write the back and forth between the proxy server 212 and proxy client 206 must occur. In a high latency network this minimum number of transaction may take a long period of time to complete and packet loss may result. If packets are lost, the transaction requests will need to be retried increasing the delay even more. Such a delay may make the hardware secure USB storage device 130 unusable or too costly.

To solve this latency/predetermined time period problem, the hardware secure USB mass storage device 130 is virtualized as a 'generic storage' device, virtual hardware secure disk 150, with CDROM driver 232 and disk driver 220 as its logical units or interfaces. Initially, the CDROM driver 232 is loaded which permits the unlocking of the virtual hardware secure disk 150. After receiving the correct password via a locking application 234, the disk driver 220 is loaded which provides an interface for reading from and writing to the virtual hardware secure disk 150.

The proxy server 212 of server 140 loads the virtual disk enumerator 214. The disk driver 220 of the server 140 is loaded and the OS loads on top the file system stack 218 if the virtual hardware secure disk 150 is already formatted with a file system (permitting an application 216 to store and retrieve files on the virtual hardware secure disk 150). With the disk driver 220 only raw reads and writes are possible. For file level access a file system is required and the virtual hardware secure disk 150 must be formatted with a file system stack 218 (for example, new technology file system (NTFS), file allocation table (FAT), FAT32, ex-FAT). For example, the server 140, in one embodiment, may partition, format or change the file system stack 218 of the virtual hardware secure disk 150 (and consequently the hardware secure USB storage device 130). File system stack 218 allows for file level read and write requests from application 216. File system stack 218 converts the file level read/write requests to storage read/write requests and post these requests to disk driver 220.

Once the virtual hardware secure disk 150 is created by the virtual disk enumerator 214, application 216 may be able to access the virtual hardware secure disk 150 with the disk driver 220 and the file system stack 218 associated with the virtual hardware secure disk 150. The disk driver 220 processes these requests by converting them to the appropriate storage read/write request. Application 216 may be one or more applications and may be one or more virtual applications. The overhead associated with a read/write request from an application 216 is handled by the disk driver 220 and file system stack 218 reducing the number of read/write transactions that must be sent to the client 120. The virtual disk enumerator 214 transmits the storage read/write requests to the proxy server 212. Proxy server 212 then transmits the read/write requests to the proxy client 206. Proxy client 206 communicates with the hardware secure USB storage device 130 via the disk stack 202. The operation of the elements of FIG. 2 are further described below with respect to FIG. 3A, FIG. 3B and FIG. 4.

Server 140 also includes a file system stack 230 associated with the CDROM driver 232. File system stack 230 may be of type compact disc file system (CDFS). This enables applications 216 to do file level reads via CDROM driver 232. The file system stack 230 converts file level reads to storage reads and posts these requests to CDROM driver 232. The CDROM driver 232 is loaded by the OS at the server 140. The file system stack 230 communicates requests to unlock the virtual hardware secure disk 150 by the CDROM driver 232 to the locking application 234. The locking application 234 is present in the CDROM driver 232 and is loaded automatically. The locking application 234 validates the password. If the password is validated, the locking application 234 communicates to the hardware security controller 236 via, for example, via vendor specific commands, to unlock and enable the disk driver 220. From thereafter the disk interface 240 (via disk driver 204, USB storage device driver 208, USB hub driver 210) will service the read and write requests.

The application 216 may make requests to access one or more virtual hardware secure disks 150. These requests may require at a minimum the five transactions as illustrated in FIG. 7. In one embodiment of the present invention, the server 140 handles all the overhead associated with a request to access one or more virtual disks 150 as further described with respect to FIG. 5.

Any one or more elements illustrated in FIG. 2 may be implemented as a single component or multiple components.

Figure 3A:
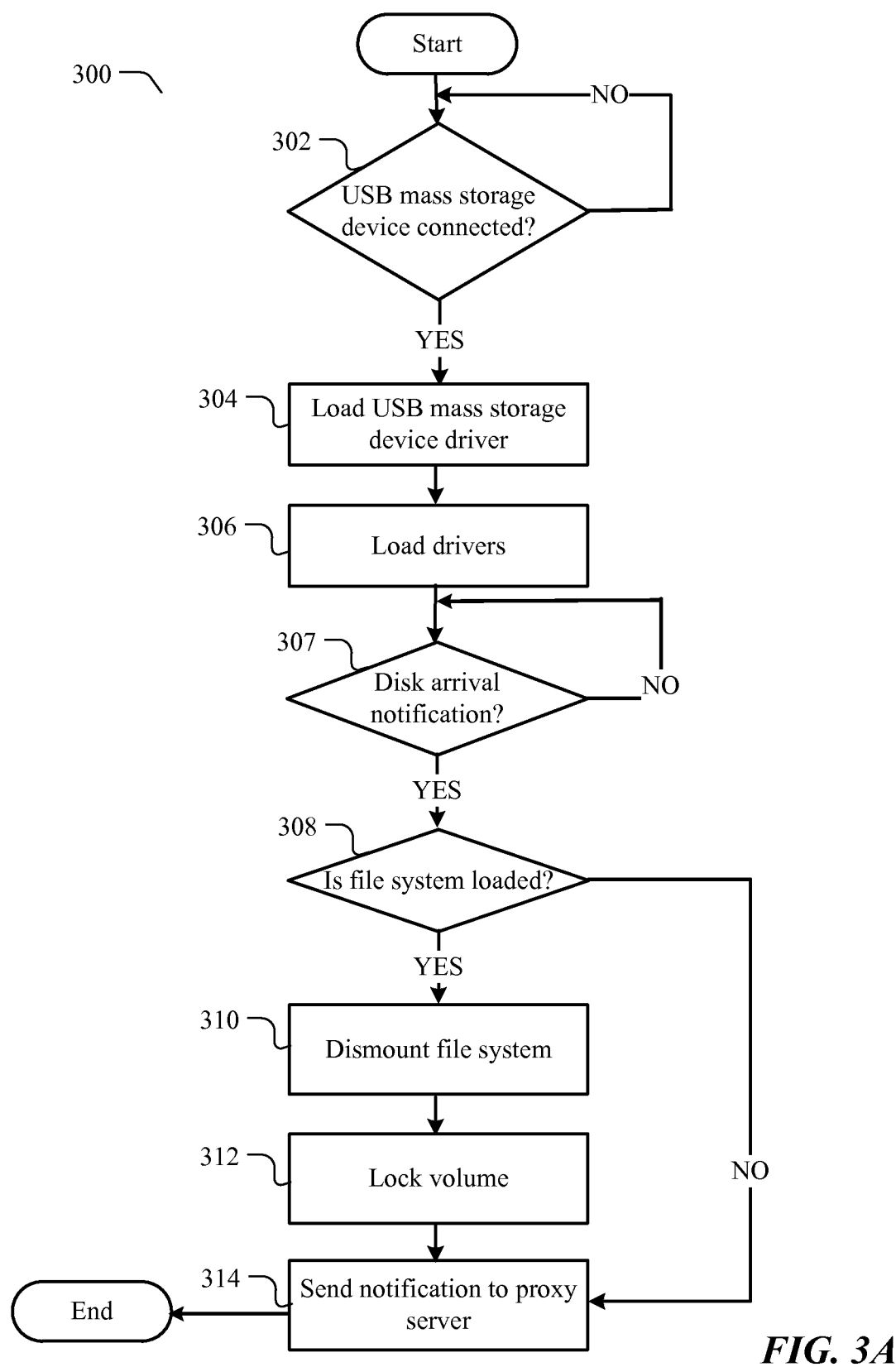
FIG. 3A illustrates an example of steps involved in one method according to one embodiment of the present disclosure.

FIG. 3A is a flow chart in accordance with an embodiment of the present disclosure, shown generally at 300, relating to preparation of the client 120 for redirection of a hardware secure USB storage device 130 such that access to the hardware secure USB storage device 130 does not require the execution of multiple transactions.

At step 302, the client 120, via proxy client 206, polls to determine if a hardware secure USB storage device 130 is connected to client 120. Proxy client 206 may determine if a hardware secure USB storage device 130 is connected by any process known to one of ordinary skill in the art. For example, in one embodiment a user may use a graphical user interface (GUI) to inform the client 120 that a hardware secure USB storage device 130 has been connected. In another embodiment, the client 120 may automatically detect without user intervention the connection of a hardware secure USB storage device 130. Hardware secure USB storage device 130 may be any known storage device including, but not limited to, a USB thumb drive/flash drive, a USB hard disk drive or any other USB storage device known to one of ordinary skill in the art that can be coupled to the client 120 via a USB. Client 120 may poll for a connection in any way known to one of ordinary skill in the art, including, but not limited, waiting on an interrupt, timer, semaphore, etc. that indicates connection of a hardware secure USB storage device such as hardware secure USB storage device 130.

If a hardware secure USB storage device 130 is connected to the client 120, then at step 304, the client 120, via proxy client 206, loads a USB storage driver 208 associated with the hardware secure USB storage device 130. At step 306, the USB storage driver 208 loads an associated disk driver 204, CDROM driver 224 and USB Storage driver 226. At step 307, the proxy client 206 waits for the disk arrival notification from the OS. In one embodiment the process continues to loop at step 307 until a disk arrival notification is received. In another embodiment, the process may send an error notification if a disk notification is not received within a predetermined time period. In another embodiment, the process may end without sending an error notification if a disk arrival notification is not received with a predetermined time period. The disk arrival notification instructs the hardware secure USB storage device 130 that the hardware secure USB storage device 130 has been properly loaded and is accessible.

The proxy client 206 registers with the server 140 for device arrival notification of the type associated with the hardware secure USB storage device 130. Once the hardware secure USB storage device 130 is connected to the client 120, the OS of the client 120 will notify the proxy client 206 with the device type information. The proxy client 206 based, at least in part, on this information will lock the USB storage device 130.

If a disk arrival notification is received, then at step 308, the client 120, via proxy client 206, determines if the file system is loaded. If the file system is not loaded, then the process continues at step 314 without loading any file system. In general, if a file system is loaded, a raw write (for example, write operation bypassing the mounted file-system) operation to a hardware secure USB storage device 130 is prohibited. In one embodiment of the present invention, this type of raw write must occur so that multiple transactions are not executed for every read/write request to the hardware secure USB storage device 130. Thus, if the file system is loaded, at step 310, the file system is dismounted. The file system may be dismounted issuing a command, such as FSCTL_DISMOUNT_VOLUME. This will ensure that the read/write requests from the server 140 are serviced properly at the client 120.

At step 312 the volume is locked. The volume may be locked by issuing a command, such as FSCTL_LOCK_VOLUME. Locking the volume includes locking the disk stack 202. This prevents any application from accessing the hardware secure USB storage device 130 except through the proxy client 206. At step 314, the proxy client 206 sends a notification, such as a plug-in notification, to the proxy server 212 that a hardware secure USB storage device 130 is prepared for virtualization at the server 140. The notification may contain one or more disk properties including, but not limited to, sector size, disk size, vendor identification, product identification, and any other disk property known to one of ordinary skill in the art.

Figure 3B:
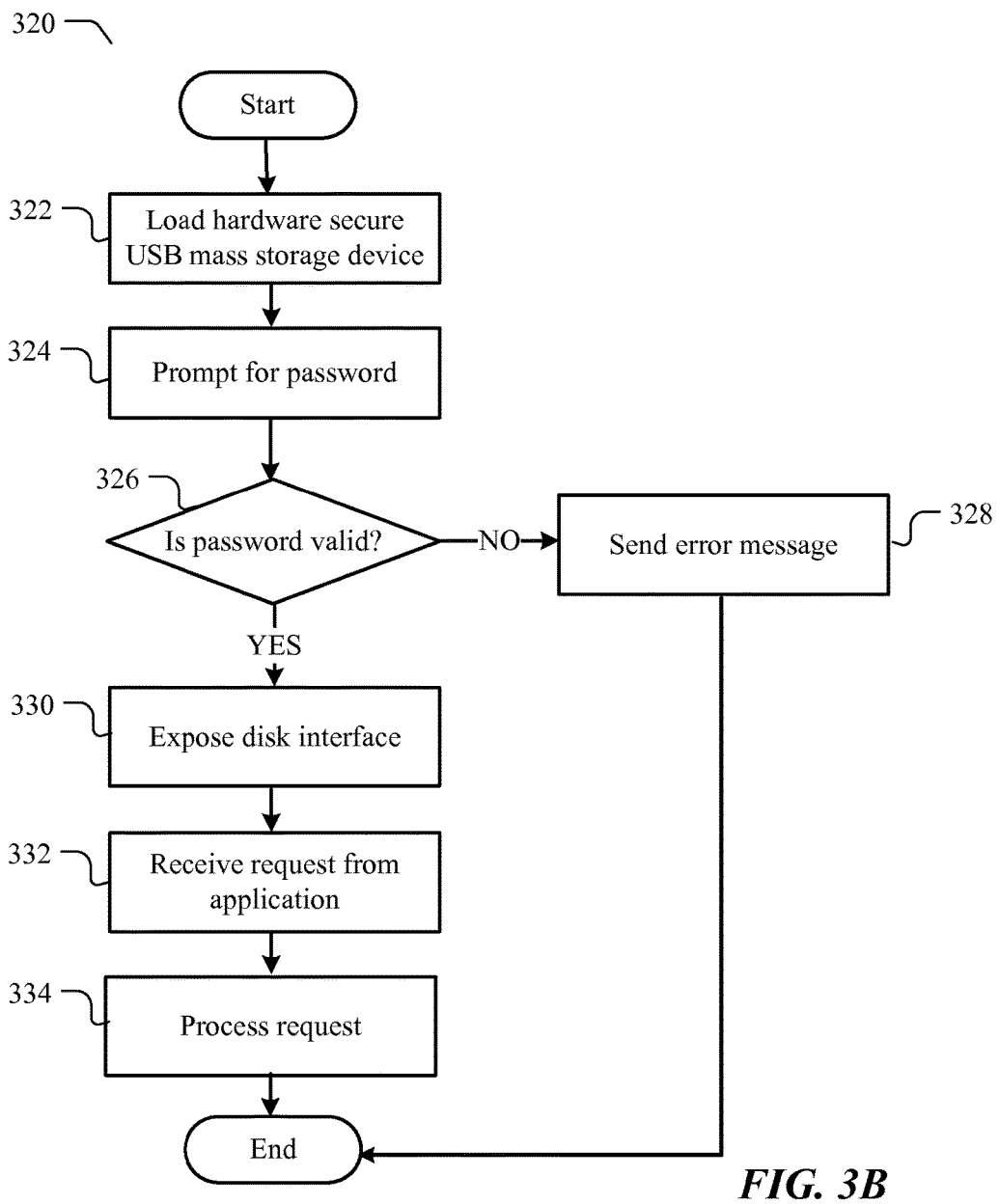
FIG. 3B illustrates an example of steps involved in one method according to one embodiment of the present disclosure.

FIG. 3B is a flow chart in accordance with one embodiment of the present disclosure shown generally at 320. At step 322, the virtual disk enumerator 214 creates a virtual hardware secure disk 150 (the redirected hardware secure USB mass storage device 130 as discussed with respect to FIG. 3A) using the CDROM driver 232 (or disk logical unit or interface). At step 324, locking application 234 of the CDROM driver 232 prompts the OS of the of the server 140 for a password. Note, when a hardware secure USB storage device 130 is first coupled to an information handling system such as client 120, the hardware secure USB storage device 130 prompts the client 120 for an initialization password that is stored at the hardware security controller 236. The password may be input by a user, for example, via a GUI, by software, or any other way known to a person of ordinary skill in the art. The password received will be utilized by the hardware secure USB storage device 130 to protect the encrypted data stored on the hardware secure USB storage device 130. When the hardware secure USB storage device 130 is disconnected and then reconnected, the client 120 may again be prompted for a password and a verification may be performed to determine if the prompted password matches the stored password.

At step 326, the locking application 234 of server 140 determines if the password is valid. If this is the initialization (the server 140 is making the virtual hardware secure disk 150 a hardware secure disk), it is determined whether the password meets the one or more criteria set for a password, for example, number of characters, combination of types of characters, length of the password, and any other criteria known by one of ordinary skill in the art. If the validation is subsequent to the initialization, then the password received from the user is compared to the stored password (the password received by the locking application 234 from the hardware security controller 236). If it is determined at step 328 that the password received does not match the stored password, then an error message is sent. The error message may be sent to a software program, to a display or to any device or component known to one of ordinary skill in the art.

If the password is validated or authenticated, then at step 330 the disk interface 240 of the hardware secure USB storage device 130 is unlocked or exposed. Prior to this step, any read/write request to the virtual hardware secure USB disk 150 will be rejected. In one embodiment, the encrypted data is made available when the server 140 requests data from the hardware secure USB storage device 130. In another embodiment, the encrypted data of the hardware secure mass storage device is exposed automatically when the hardware secure storage device 130 is loaded by the client 120. In another embodiment, the hardware secure storage device 130 is not redirected until the password has been authenticated. That is, steps 324, 326 and 328 may all be executed before the hardware secure storage device 130 is redirected.

At step 332, the client 120 receives a request to access hardware secure USB storage device 130 via proxy client 206 from proxy server 212. At step 334, the request is processed. The proxy server 212 will post the request via proxy client 206 to the disk driver 204 and CDROM driver 224. Because the hardware secure storage device 130 has been unlocked the request will be handled in the same manner as a request for a non-hardware secure device.

Figure 4:
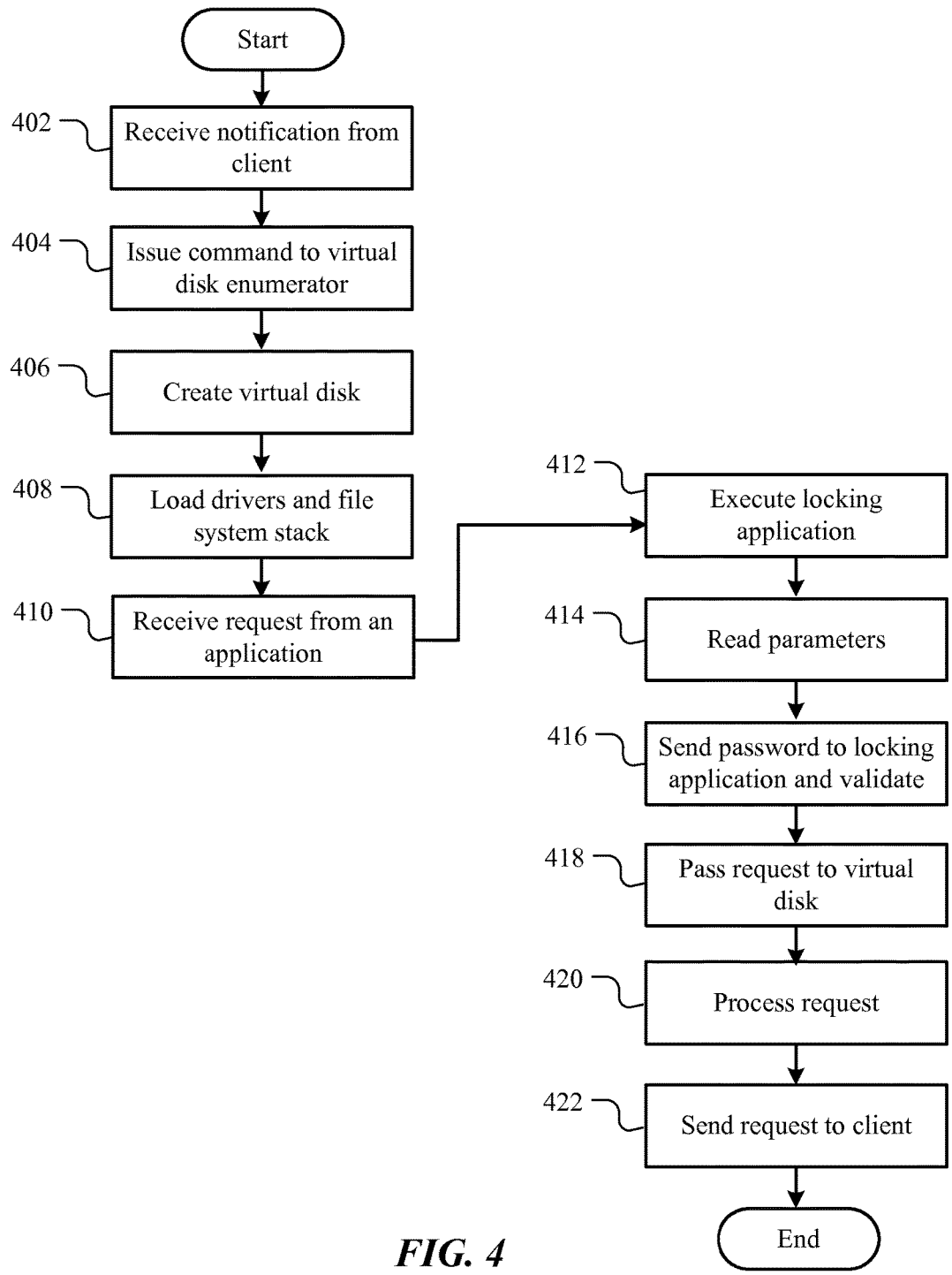
FIG. 4 illustrates an example of steps involved in one method according to one embodiment of the present disclosure.

FIG. 4 is a flow chart in accordance with one embodiment of the present invention shown generally at 400. At step 402, the server 140 receives a disk arrival notification from the client 120 that a hardware secure USB storage device 130 is ready for virtualization such that it can be accessed from one or more applications 216. The disk arrival notification may include one or more parameters. The notification is sent from the proxy client 206 to the proxy server 212. At step 404, the proxy server 212 issues a command to the virtual disk enumerator 214 to create the virtual hardware secure disk 150. The command may be an input/output control (IOCTL) command or any other such command known to one of ordinary skill in the art. The virtual disk enumerator 214 at step 406 creates the virtual disk based, at least in part, on any one or more of the disk properties associated with the notification.

At step 408, CDROM driver 232 is loaded and then the disk driver 220 is loaded. The file system stack 218 is loaded on top of the driver 220. The file system stack 230 is loaded on top of the CDROM driver 232. The CDROM driver 232, disk driver 220, file system stack 218 and file system stack 230 are loaded by the OS based, at least in part, on one or more properties of the virtual hardware secure disk 150. In one embodiment, the locking software associated with the hardware secure USB storage device 130 is received by the client 120 before creating the virtual hardware secure disk 150. In another embodiment, the server 140 creates the virtual hardware secure disk 150 as a hardware secure USB storage device such that a locking application 234 is required to unlock a secured disk interface/logical unit of the virtual hardware secure disk 150. Once step 408 is completed, a request is received by one or more applications 216. The request is received by the virtual hardware secure disk 150 via the virtual disk enumerator 214 at step 410.

At step 412, the locking application 234 is executed. In one embodiment, step 410 need not occur prior to step 412. That is, the secured disk interface/logical unit of virtual hardware secure disk 150 may be unlocked prior to receiving any request by an application 216. In another embodiment, each time a request is received from an application 216, the secured disk interface/logical unit must be unlocked such that for each request from an application 216 steps 412-416 must be performed. In another embodiment, once a request from an application 216 for virtual hardware secure disk 150, steps 412-416 are executed and the secured disk interface/logical unit remains unlocked until a request is received to lock the secured disk interface/logical unit.

At step 414, one or more parameters are read from the virtual hardware secure disk 150. The one or more parameters may be received with the disk arrival notification. The one or more parameters may include one or more of a hardware secure password, a serial number of the virtual hardware secure disk 150, information stored in a reserved sector of the virtual hardware secure disk 150, or any other parameter known to one of ordinary skill in the art. In one embodiment, the serial number of the hardware secure USB storage device 130 is one of the one or more properties received by the server 140 from the client 120 during creation of the virtual hardware secure disk 150.

The locking application 234 may only require the appropriate password. Once the password is read (or entered by the user), at step 416 the password is sent to the locking application 234. Upon a successful validation, the locking application 234 sends the hardware security controller 236 vendor specific commands to unlock the secured disk interface 240. The locking application 234 may require that the parameters be sent within a predetermined time period or access is denied. For example, the locking application 234 may require that the correct parameters be received by the locking application 234 within two seconds or three seconds. The predetermined time period may be a setting in the locking application 234. In one embodiment, a setting may be configurable by an administrator such that the predetermined time period may be increased or decreased. In another embodiment, the predetermined time period is fixed by the manufacturer of the locking software. In another embodiment, the setting itself may require a password and any of one or more parameters before the setting may be altered. In this way, all transactions related to unlocking a secured disk interface/logical unit are handled at the server 140 as opposed to transmitting all the transactions to the client 120 for processing.

Figure 5:
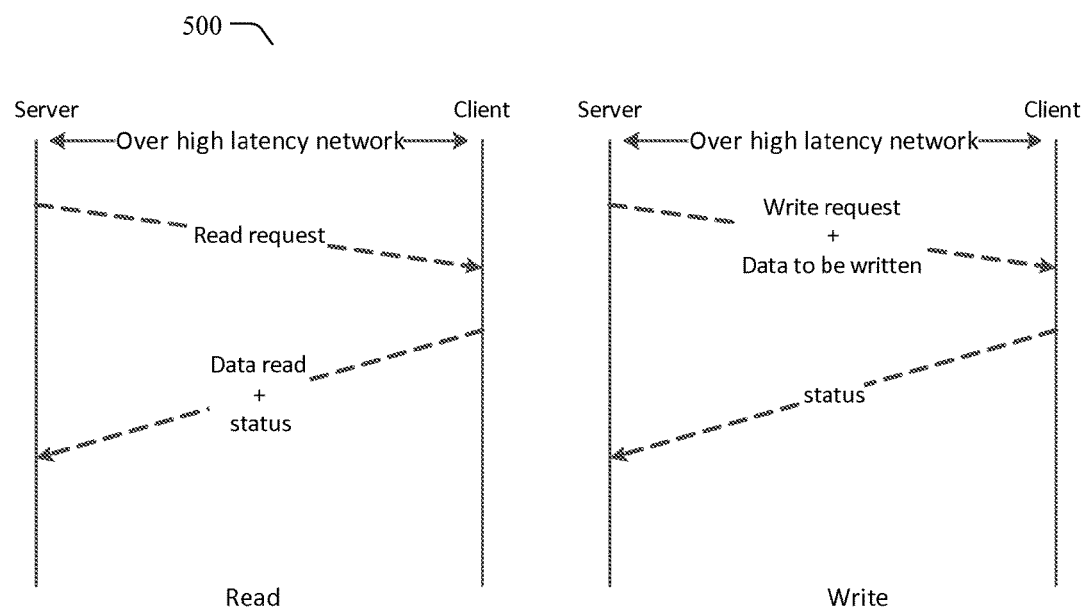
FIG. 5 illustrates transaction requests between a client and server according to one embodiment of the present disclosure.

At step 418, if the parameters are correct and the locking application 234 unlocks the virtual hardware secure disk 150, the request is passed to the virtual hardware secure disk 150. At step 420 the request is processed. The transaction requests received by the disk driver 220 from the virtual disk enumerator 214 are either read requests or write requests. If the file system is loaded, the file read requests and write requests will be converted to storage read/write requests by the disk driver 220. The overhead associated with the transaction request from an application 216 is handled by the disk driver 220 and file system stack 218 reducing the number of read/write transactions that must be sent to the client 120. For example, in one embodiment the transaction request is a write request. Only the write command along with the associated data is transmitted to the client 120 and only the status is received back from the client 120 as illustrated in FIG. 5. The CBW transfer, CBW completion, and CSW request as illustrated in FIG. 7 are not necessary as the disk driver 220 and file system stack 218 have handled these overhead transactions. Similarly in another embodiment the transaction request is a read request. Only the read command is transmitted to the client 120 with the client 120 returning only the data requested and the status as illustrated in FIG. 5. The CBW transfer, CBW completion and CSW request as illustrated in FIG. 7 are not necessary as the disk driver 220 and file system stack 218 have handled these overhead transactions.

At step 422, the virtual disk enumerator 214 transmits the transaction request (read/write) via the proxy server 212 to the proxy client 206 which posts the transaction request to the disk stack 202 at the client 120. As shown generally at 500 of FIG. 5, according to one embodiment of the present disclosure, only the read request for the virtual hardware secure disk 150 is sent from the server 140 to the client 120 which responds back to the server 140 with the data requested from the hardware secure USB storage device 130 along with the status of the hardware secure USB storage device 130. Likewise, according to one embodiment of the present disclosure, a write request along with the data to be written is for the virtual hardware secure disk 150 is sent from the server 140 to the client 120 which responds back to the server 140 with the status of the hardware secure USB storage device 130. Thus, only two transaction requests need be executed as compared to the at least five transaction requests required by traditional systems.

If a hardware secure USB storage device 130 is disconnected, the OS may send a disk removal notification to the proxy client 206 and the server 140 will stop servicing any new I/O requests. The OS of the server 140, after receiving notification from the proxy server 212, will unload the file system stack 218 and the disk driver 220.

Figure 6:
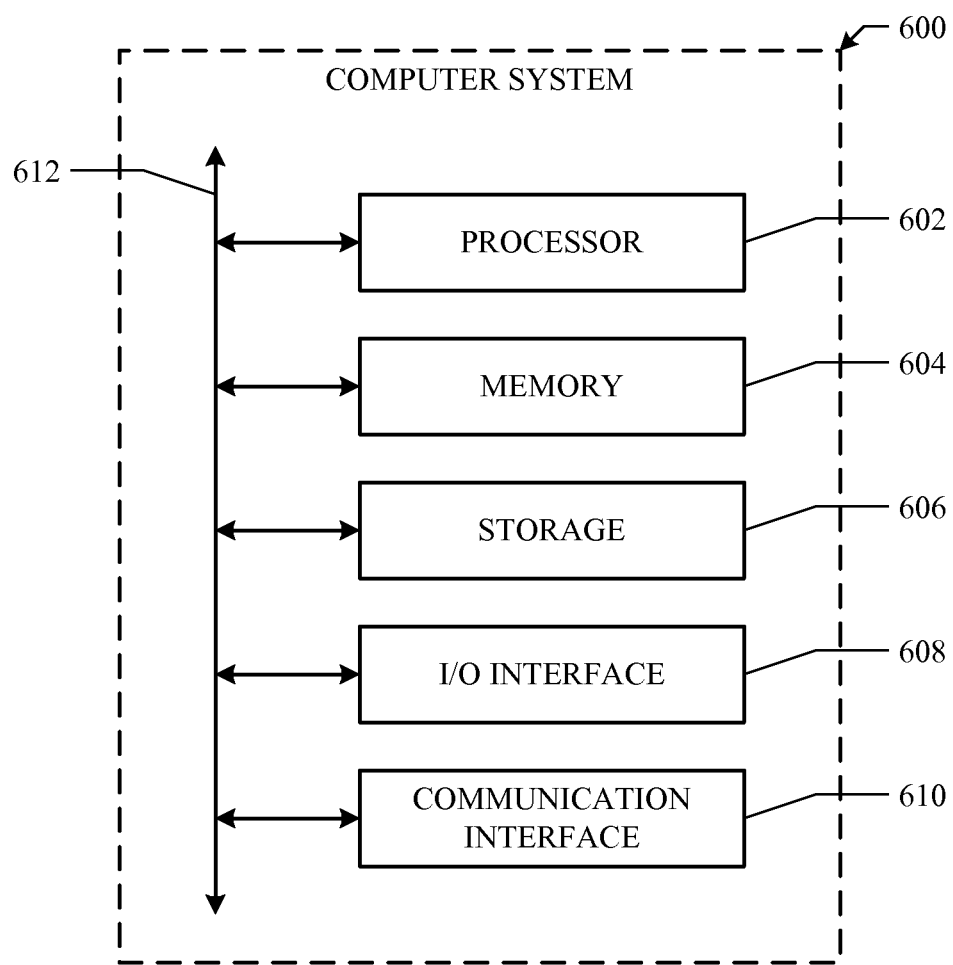
FIG. 6 illustrates an example computing system according to one embodiment of the present disclosure.

Particular embodiments may be implemented on one or more electronic devices or information handling systems. FIG. 6 illustrates an example information handling system, computer system 600. For example, computer system 600 may be an embodiment for a device that runs a user interface content editor. In particular embodiments, one or more computer systems 600 perform one or more steps of one or more methods described or illustrated herein. In particular embodiments, one or more computer systems 600 provide functionality described or illustrated herein. In particular embodiments, software running on one or more computer systems 600 performs one or more steps of one or more methods described or illustrated herein or provides functionality described or illustrated herein. Particular embodiments include one or more portions of one or more computer systems 600.

This disclosure contemplates any suitable number of computer systems 600. This disclosure contemplates computer system 600 taking any suitable physical form. As example and not by way of limitation, computer system 600 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, or a combination of two or more of these. Where appropriate, computer system 600 may include one or more computer systems 600; be unitary or distributed; span multiple locations; span multiple machines; or reside in a cloud, which may include one or more cloud components in one or more networks. Where appropriate, one or more computer systems 600 may perform without substantial spatial or temporal limitation one or more steps of one or more methods described or illustrated herein. As an example and not by way of limitation, one or more computer systems 600 may perform in real time or in batch mode one or more steps of one or more methods described or illustrated herein. One or more computer systems 600 may perform at different times or at different locations one or more steps of one or more methods described or illustrated herein, where appropriate.

In particular embodiments, computer system 600 includes a processor 602, memory 604, storage 606, an input/output (I/O) interface 608, a communication interface 610, and a bus 612. Although this disclosure describes and illustrates a particular computer system having a particular number of particular components in a particular arrangement, this disclosure contemplates any suitable computer system having any suitable number of any suitable components in any suitable arrangement.

In particular embodiments, processor 602 includes hardware for executing instructions, such as those making up a computer program. The instructions may be part of one or more modules. As an example and not by way of limitation, to execute instructions, processor 602 may retrieve (or fetch) the instructions from an internal register, an internal cache, memory 604, or storage 606; decode and execute them; and then write one or more results to an internal register, an internal cache, memory 604, or storage 606. In particular embodiments, processor 602 may include one or more internal caches for data, instructions, or addresses. This disclosure contemplates processor 602 including any suitable number of any suitable internal caches, where appropriate. As an example and not by way of limitation, processor 602 may include one or more instruction caches, one or more data caches, and one or more translation lookaside buffers (TLBs). Instructions in the instruction caches may be copies of instructions in memory 604 or storage 606, and the instruction caches may speed up retrieval of those instructions by processor 602. Data in the data caches may be copies of data in memory 604 or storage 606 for instructions executing at processor 602 to operate on; the results of previous instructions executed at processor 602 for access by subsequent instructions executing at processor 602 or for writing to memory 604 or storage 606; or other suitable data. The data caches may speed up read or write operations by processor 602. The TLBs may speed up virtual-address translation for processor 602. In particular embodiments, processor 602 may include one or more internal registers for data, instructions, or addresses. This disclosure contemplates processor 602 including any suitable number of any suitable internal registers, where appropriate. Where appropriate, processor 602 may include one or more arithmetic logic units (ALUs); be a multi-core processor; or include one or more processors 602. Although this disclosure describes and illustrates a particular processor, this disclosure contemplates any suitable processor.

In particular embodiments, memory 604 includes main memory for storing instructions for processor 602 to execute or data for processor 602 to operate on. As an example and not by way of limitation, computer system 600 may load instructions from storage 606 or another source (such as, for example, another computer system 600) to memory 604. Processor 602 may then load the instructions from memory 604 to an internal register or internal cache. To execute the instructions, processor 602 may retrieve the instructions from the internal register or internal cache and decode them. During or after execution of the instructions, processor 602 may write one or more results (which may be intermediate or final results) to the internal register or internal cache. Processor 602 may then write one or more of those results to memory 604. In particular embodiments, processor 602 executes only instructions in one or more internal registers or internal caches or in memory 604 (as opposed to storage 606 or elsewhere) and operates only on data in one or more internal registers or internal caches or in memory 604 (as opposed to storage 606 or elsewhere). One or more memory buses (which may each include an address bus and a data bus) may couple processor 602 to memory 604. Bus 612 may include one or more memory buses, as described below. In particular embodiments, one or more memory management units (MMUs) reside between processor 602 and memory 604 and facilitate accesses to memory 604 requested by processor 602. In particular embodiments, memory 604 includes random access memory (RAM). This RAM may be volatile memory, where appropriate. Where appropriate, this RAM may be dynamic RAM (DRAM) or static RAM (SRAM). Moreover, where appropriate, this RAM may be single-ported or multi-ported RAM. This disclosure contemplates any suitable RAM. Memory 604 may include one or more memories 604, where appropriate. Although this disclosure describes and illustrates particular memory, this disclosure contemplates any suitable memory.

In particular embodiments, storage 606 includes mass storage for data or instructions. As an example and not by way of limitation, storage 606 may include a hard-disk drive (HDD), a floppy disk drive, flash memory, an optical disc, a magneto-optical disc, magnetic tape, or a Universal Serial Bus (USB) drive or a combination of two or more of these. Storage 606 may include removable or non-removable (or fixed) media, where appropriate. Storage 606 may be internal or external to computer system 600, where appropriate. In particular embodiments, storage 606 is non-volatile, solid-state memory. In particular embodiments, storage 606 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 606 taking any suitable physical form. Storage 606 may include one or more storage control units facilitating communication between processor 602 and storage 606, where appropriate. Where appropriate, storage 606 may include one or more storages 606. Although this disclosure describes and illustrates particular storage, this disclosure contemplates any suitable storage.

In particular embodiments, I/O interface 608 includes hardware, software, or both providing one or more interfaces for communication between computer system 600 and one or more I/O devices. Computer system 600 may include one or more of these I/O devices, where appropriate. One or more of these I/O devices may enable communication between a person and computer system 600. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 608 for them. Where appropriate, I/O interface 608 may include one or more device or software drivers enabling processor 602 to drive one or more of these I/O devices. I/O interface 608 may include one or more I/O interfaces 608, where appropriate. Although this disclosure describes and illustrates a particular I/O interface, this disclosure contemplates any suitable I/O interface.

In particular embodiments, communication interface 610 includes hardware, software, or both providing one or more interfaces for communication (such as, for example, packet-based communication) between computer system 600 and one or more other computer systems 600 or one or more networks. As an example and not by way of limitation, communication interface 610 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 610 for it. As an example and not by way of limitation, computer system 600 may communicate with an ad hoc network, a personal area network (PAN), a LAN, a WAN, a metropolitan area network (MAN), or one or more portions of the Internet or a combination of two or more of these. One or more portions of one or more of these networks may be wired or wireless. As an example, computer system 600 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination of two or more of these. Computer system 600 may include any suitable communication interface 610 for any of these networks, where appropriate. Communication interface 610 may include one or more communication interfaces 610, where appropriate. Although this disclosure describes and illustrates a particular communication interface, this disclosure contemplates any suitable communication interface.

In particular embodiments, bus 612 includes hardware, software, or both coupling components of computer system 600 to each other. As an example and not by way of limitation, bus 612 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 612 may include one or more buses 612, where appropriate. Although this disclosure describes and illustrates a particular bus, this disclosure contemplates any suitable bus or interconnect.

Herein, a computer-readable non-transitory storage medium or media may include one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The concepts disclosed in this application should not be understood to be limited to the exemplary embodiments described herein, but should be understood to encompass all changes, substitutions, variations, alterations, and modifications to the example embodiments herein that a person having ordinary skill in the art would comprehend. Moreover, although this disclosure describes and illustrates respective embodiments herein as including particular components, elements, functions, operations, or steps, any of these embodiments may include any combination or permutation of any of the components, elements, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative.

What is claimed is:

1. A method comprising:
   receiving, at a server, a disk arrival notification that a hardware secure universal serial bus (USB) storage device has been coupled to a client, wherein the hardware secure USB storage device comprises a chip for handling encryption of data;
   issuing a command by a proxy server of the server to a virtual disk enumerator to create a virtual disk associated with the hardware secure USB storage device;
   loading a disk driver and compact disk read-only memory (CDROM) driver as interfaces to the virtual disk;
   loading a file system stack associated with the disk driver;
   loading a CDROM file system stack associated with the CDROM driver;
   executing a locking application, wherein the locking application resides in the CDROM driver;
   receiving by the locking application a hardware secure password;
   validating by the locking application the hardware secure password; and
   unlocking a secured disk interface of the virtual disk, based at least in part, on the validating the hardware secure password.

2. The method of claim 1, further comprising:
   reading one or more parameters from the virtual disk, wherein the one or more parameters comprise at least the hardware secure password.

3. The method of claim 1 further comprising:
   receiving by the locking application one or more parameters associated with the virtual disk; and
   validating the one or more parameters within a predetermined time period.

4. The method of claim 3, wherein the one or more parameters comprise at least one of a password and a serial number.

5. The method of claim 1, wherein the server creates the secured disk interface.

6. The method of claim 1, further comprising:
   communicating a request to unlock the virtual disk by the CDROM file system stack to the locking application.

7. The method of claim 6, wherein the request is communicated to the CDROM file system stack by the CDROM driver.

8. A system comprising:
   a first server;
   one or more central processing units for processing information of the first server;
   a memory of the first server communicatively coupled to the one or more central processing units; and
   one or more modules that comprise instructions stored in the memory, the instructions, when executed by the one or more processing units, operable to perform operations comprising:
      receiving, at the server, a disk arrival notification that a hardware secure universal serial bus (USB) storage device has been coupled to a client, wherein the hardware secure USB storage device comprises a chip for handling encryption of data;
      issuing a command by a proxy server of the server to a virtual disk enumerator to create a virtual disk associated with the hardware secure USB storage device;
      loading a disk driver and compact disk read-only memory (CDROM) driver as interfaces to the virtual disk;
      loading a file system stack associated with the disk driver;
      loading a CDROM file system stack associated with the CDROM driver;
      executing a locking application, wherein the locking application resides in the CDROM driver;
      receiving by the locking application a hardware secure password;
      validating by the locking application the hardware secure password; and
      unlocking a secured disk interface of the virtual disk, based at least in part, on the validating the hardware secure password.

9. The system of claim 8, wherein the instructions further operable to perform operations comprising:
   reading one or more parameters from the virtual disk, wherein the one or more parameters comprise at least the hardware secure password.

10. The system of claim 8, wherein the instructions further operable to perform operations comprising:
    receiving by the locking application one or more parameters associated with the virtual disk; and
    validating the one or more parameters within a predetermined time period.

11. The system of claim 10, wherein the one or more parameters comprise at least one of a password and a serial number.

12. The system of claim 8, wherein the server creates the secured disk interface.

13. The system of claim 8, wherein the instructions further operable to perform operations comprising:
    communicating a request to unlock the virtual disk by the CDROM file system stack to the locking application.

14. The system of claim 13, wherein the request is communicated to the CDROM file system stack by the CDROM driver.

15. One or more computer-readable non-transitory storage media embodying software operable when executed by one or more computer systems to:
    receive, at a server, a disk arrival notification that a hardware secure universal serial bus (USB) storage device has been coupled to a client, wherein the hardware secure USB storage device comprises a chip for handling encryption of data;
    issue a command by a proxy server of the server to a virtual disk enumerator to create a virtual disk associated with the hardware secure USB storage device;
    load a disk driver and compact disk read-only memory (CDROM) driver as interfaces to the virtual disk;

load a file system stack associated with the disk driver;
load a CDROM file system stack associated with the CDROM driver;
execute a locking application, wherein the locking application resides in the CDROM driver;
receive by the locking application a hardware secure password;
validate by the locking application the hardware secure password; and
unlock a secured disk interface of the virtual disk, based at least in part, on the validating the hardware secure password.

16. The media of claim 15, wherein the software is further operable when executed by the one or more computer systems to:
read one or more parameters from the virtual disk, wherein the one or more parameters comprise at least the hardware secure password.

17. The media of claim 15, wherein the software is further operable when executed by the one or more computer systems to:
receive by the locking application one or more parameters associated with the virtual disk; and
validate the one or more parameters within a predetermined time period.

18. The media of claim 17, wherein the one or more parameters comprise at least one of a password and a serial number.

19. The media of claim 15, wherein the software is further operable when executed by the one or more computer systems to:
communicate a request to unlock the virtual disk by the CDROM file system stack to the locking application.

20. The media of claim 19, wherein the request is communicated to the CDROM file system stack by the CDROM driver.

* * * * *